(12) United States Patent
Sakakibara et al.

(10) Patent No.: US 9,065,945 B2
(45) Date of Patent: Jun. 23, 2015

(54) IMAGE READING DEVICE

(71) Applicant: BROTHER KOGYO KABUSHIKI KAISHA, Nagoya-shi, Aichi-ken (JP)

(72) Inventors: Arisa Sakakibara, Nagoya (JP); Takayuki Akimatsu, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/227,686

(22) Filed: Mar. 27, 2014

(65) Prior Publication Data
US 2015/0092254 A1 Apr. 2, 2015

(30) Foreign Application Priority Data
Sep. 27, 2013 (JP) ................................. 2013-202226

(51) Int. Cl.
*H04N 1/04* (2006.01)
*H04N 1/00* (2006.01)

(52) U.S. Cl.
CPC ....... *H04N 1/00543* (2013.01); *H04N 1/00588* (2013.01); *H04N 1/00591* (2013.01); *H04N 1/00602* (2013.01); *H04N 1/00615* (2013.01); *H04N 2201/0081* (2013.01); *H04N 2201/0094* (2013.01)

(58) Field of Classification Search
CPC .......... H04N 1/00543; H04N 1/00588; H04N 1/00591; H04N 1/00602; H04N 1/00615; H04N 2201/0081; H04N 2201/0094
USPC .................................. 358/498, 497, 496, 474
See application file for complete search history.

(56) References Cited

U.S. PATENT DOCUMENTS

| | | | |
|---|---|---|---|
| 7,379,700 B2 * | 5/2008 | Iwata | 399/367 |
| 8,687,248 B2 * | 4/2014 | Takeuchi et al. | 358/498 |
| 2002/0056957 A1 * | 5/2002 | Sekine | 271/3.14 |
| 2011/0242624 A1 | 10/2011 | Takeuchi et al. | |
| 2012/0155941 A1 | 6/2012 | Kozaki et al. | |

FOREIGN PATENT DOCUMENTS

| | | |
|---|---|---|
| JP | 2002-145457 A | 5/2002 |
| JP | 2011-211478 A | 10/2011 |
| JP | 2012-126530 A1 | 7/2012 |

* cited by examiner

*Primary Examiner* — Houshang Safaipour
(74) *Attorney, Agent, or Firm* — Merchant & Gould PC

(57) ABSTRACT

An image reading device includes a conveying unit, an upper support portion, a lower support portion, and a read unit. The upper support portion and the lower support portion are positioned so as to at least partially overlap and be spaced apart from each other vertically. The upper support portion has a first upper support farthest from the conveying unit, a second upper support closer to the conveying unit than the first upper support, and a third upper support closer to the conveying unit than the second upper support. The second upper support is movable between a closed position and an open position, positioned to support a sheet in the closed position and to expose at least a part of the lower support portion in the open position, and having an upper surface in the closed position that lacks a sheet guide.

21 Claims, 7 Drawing Sheets

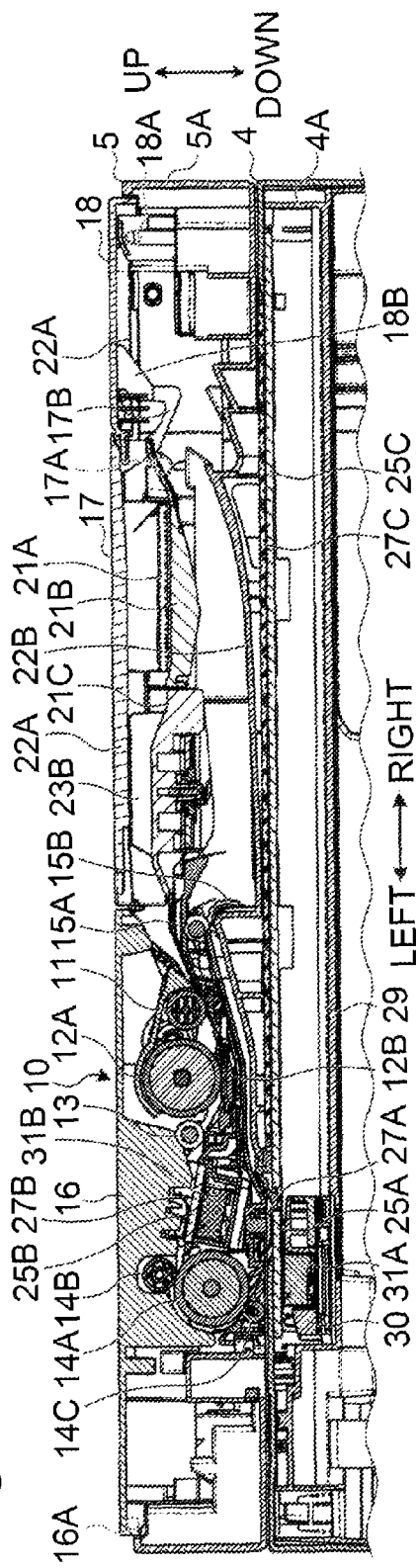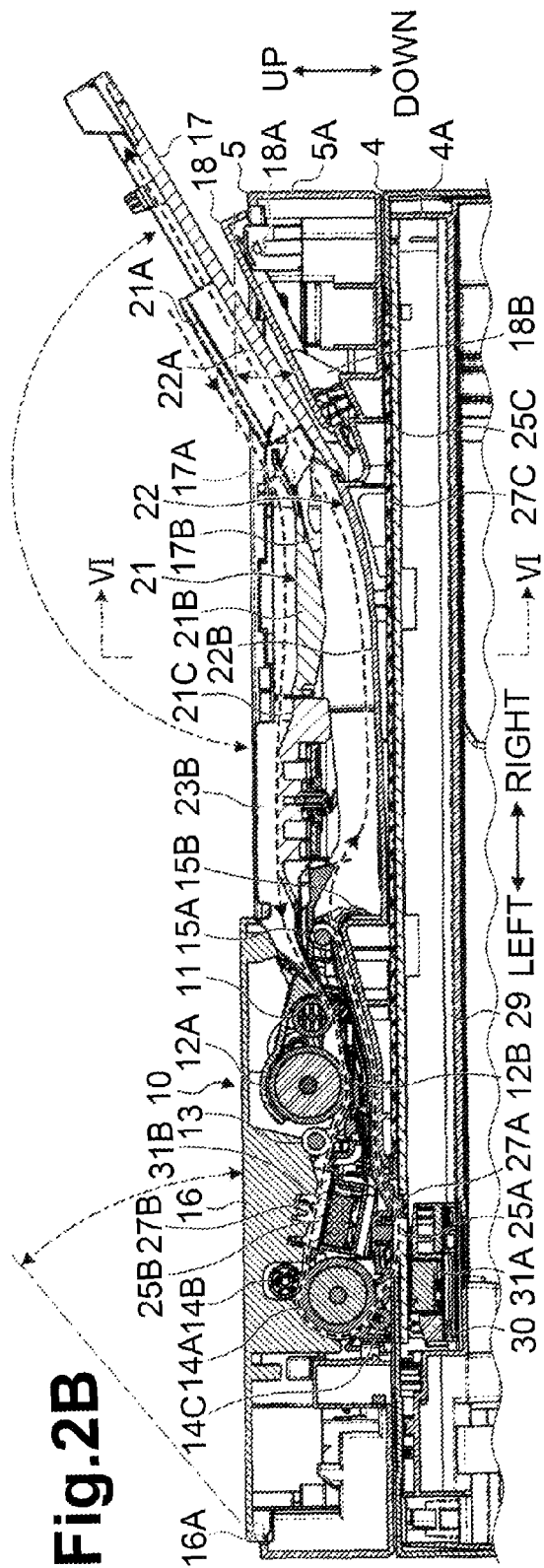

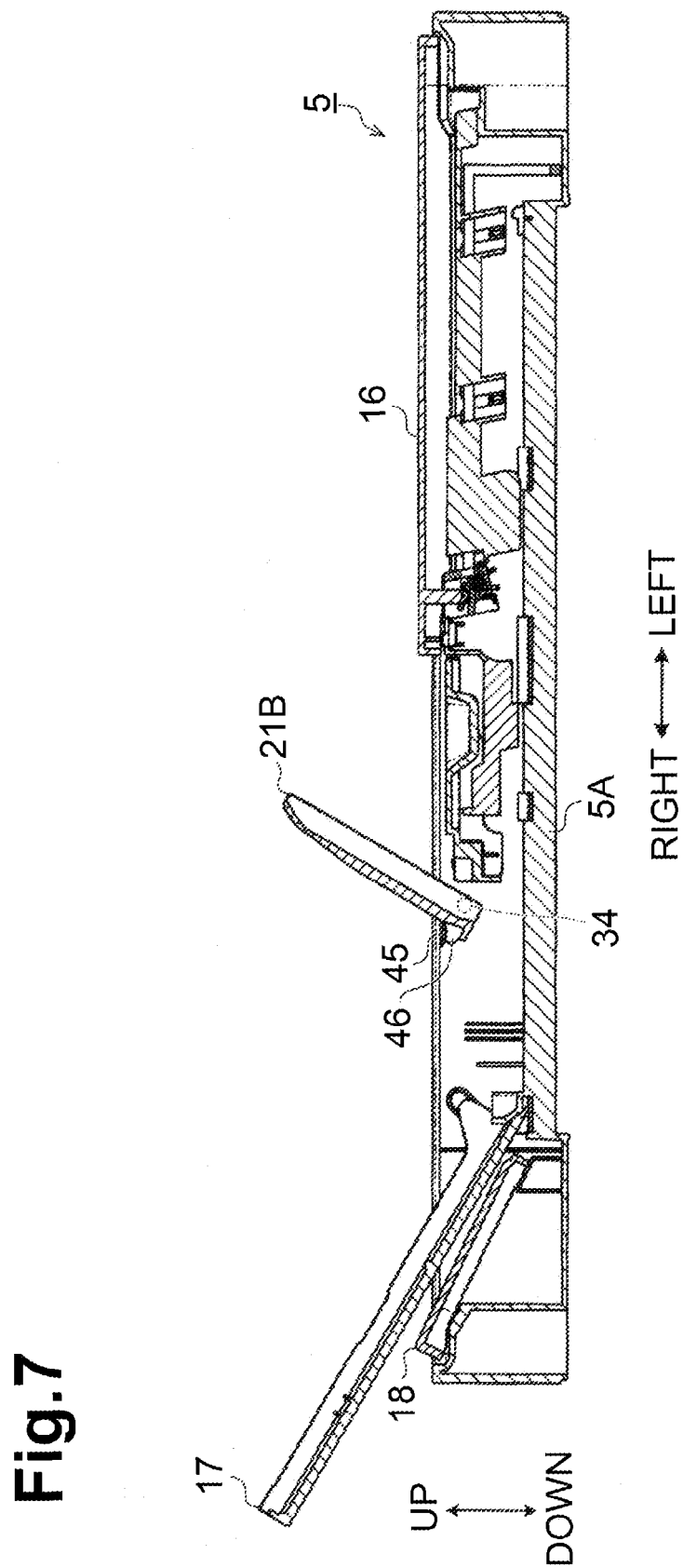

IMAGE READING DEVICE

CROSS-REFERENCE TO RELATED APPLICATION

This application claims priority from Japanese Patent Application No. 2013-202226 filed on Sep. 27, 2013, which is incorporated herein by reference in its entirety.

TECHNICAL FIELD

Aspects disclosed herein relate to an image reading device.

BACKGROUND

It is known that in a conventional image reading device having an automatic document feeder (ADF), when the device is not in use, a feed tray and a discharge tray are used as external covers.

As for the known image reading device, when the feed tray and discharge tray are in use, they are located so as to overlap each other with the discharge tray disposed below the feed tray as viewed from above the device; a space between them is used as an area into which a sheet is discharged.

SUMMARY

In an image reading device as described above, however, a sheet having a small dimension in a conveying direction can be discharged to the discharge tray such that it remains obscured below the feed tray. Therefore, the user cannot easily insert a hand into the narrow space below the feed tray to take out the discharged sheet because the feed tray interferes. Another problem is that if a sheet jam occurs below the feed tray, the user has to insert a hand into the narrow space below the feed tray, so the user cannot easily remove the jammed sheet because the feed tray interferes.

To allow a user to insert his or her hand below the feed tray to access sheets having a small dimension (or in the event of a sheet jam), a possible countermeasure is to place the feed tray at a higher position to adequately enlarge the space below the feed tray. However, this countermeasure leads to another problem in that the dimension of the entire device in the height direction is increased by an amount by which the feed tray is raised upward and the device is thereby enlarged.

The problems described above may also occur when the positions of the feed tray and discharge tray are reversed. That is, in contrast to the above image reading device, a structure can also be used in which a feed tray is disposed on the lower side and a discharge tray is disposed on the upper side, in which case a sheet is conveyed from below to above. If, in this structure, a space below the discharge tray is narrow, the user cannot easily insert a hand because the discharge tray interferes, making it difficult to set a small sheet onto the feed tray such that the sheet would be engaged by a conveying unit of the ADF. Another problem is that if a sheet jam occurs at the back of the feed tray, the user cannot easily remove the jammed sheet because the discharge tray interferes. As above, a possible countermeasure against these problems is to place the discharge tray at a higher position. However, this countermeasure leads to another problem as described above in that the dimension of the entire device in the height direction is increased by an amount by which the discharge tray is raised upward and the device is thereby enlarged.

That is, any one of an upper support portion that supports a sheet on the upper side and a lower support portion that supports the sheet on the lower side can be used as the feed tray or discharge tray and the other can be used as the discharge tray or feed tray. Even if the positions of the feed tray and discharge tray are exchanged, the problem that the sheet cannot be easily inserted into or taken out from the lower support portion still remains.

A technology described below solves at least some of the above problems. In some cases, embodiments described herein provide an image reading device that enables a sheet to be easily taken out from and set in the lower support portion in spite of the upper support portion being disposed above the lower support portion so that they overlap each other.

According to an example aspect, an image reading device includes a conveying unit defining a conveying path, an upper support portion positioned to support a sheet at a first end of the conveying path, a lower support portion positioned to support a sheet at a second end of the conveying path, and a read unit positioned along the conveying path. The upper support portion is disposed above the lower support portion such that the upper support portion and the lower support portion are positioned so as to at least partially overlap and be spaced apart from each other vertically. The upper support portion has a first upper support farthest from the conveying unit, a second upper support closer to the conveying unit than the first upper support, and a third upper support closer to the conveying unit than the second upper support. The second upper support is movable between a closed position and an open position, the second upper support positioned to support a sheet in the closed position and to expose at least a part of the lower support portion in the open position, the second upper support having an upper surface in the closed position that lacks a sheet guide.

DESCRIPTION OF THE DRAWINGS

For a more complete understanding of the present disclosure, needs satisfied thereby, and the objects, features, and advantages thereof, reference now is made to the following descriptions taken in connection with the accompanying drawings.

FIGS. 2A and 2B illustrate the internal structure of an image reading device; FIG. 2A is a vertical cross-sectional view illustrating a state in which a second cover of an automatic document feeder (ADF) is closed, and FIG. 2B is a vertical cross-sectional view illustrating a state in which the second cover is open.

FIG. 7 is a cross sectional view taken along line VII-VII in FIG. 6.

DETAILED DESCRIPTION

Illustrative embodiments are described in detail with reference to the accompanying drawings.

<Structure of the Multi-Function Peripheral>

Figure 1:
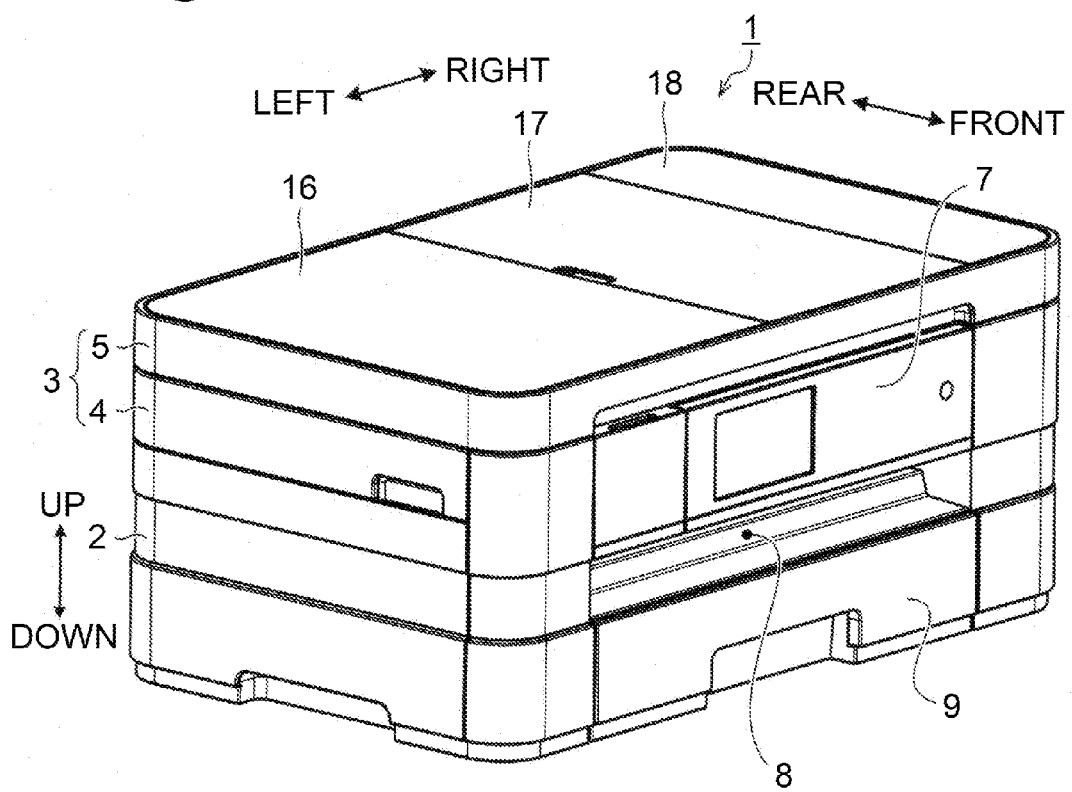
FIG. 1 is a perspective view illustrating a multi-function peripheral.

The multi-function peripheral 1 illustrated in FIG. 1 has a structure equivalent to an example of the above image reading device. In the descriptions below, the vertical direction, right and left direction, and front and rear direction indicated on the drawings are used to simply explain relative positional relationships among portions constituting the multi-function peripheral 1. However, those directions are merely intended to refer to relative directions of components of a multi-function peripheral 1, rather than implying a required orientation of the multi-function peripheral 1 or components thereof.

The multi-function peripheral 1 has a main body unit 2 and a reading unit 3 mounted on the main body unit 2. The reading unit 3 is attached so as to openable and closable with respect to the main body unit 2. With the reading unit 3 closed, an opening formed in the upper surface of the main body unit 2 is covered by the reading unit 3.

The reading unit 3 has a flat bed (FB) 4 and an ADF 5 provided on the FB 4. The ADF 5 is attached so as to openable and closable with respect to the FB 4. With the ADF 5 closed, the ADF 5 functions as a cover that covers the upper surface of the FB 4.

The main body unit 2 internally includes a control unit, an image forming unit, a local area network (LAN) communication unit, and the like. A manipulation panel 7 manipulated by the user is provided on the upper portion of the front of the main body unit 2. An outlet opening 8, from which a recording medium on which an image has been formed by the image forming unit is taken out, is formed below the manipulation panel 7. A medium supply cassette 9, in which recording media to be supplied to the image forming unit are stored, is attached below the outlet opening 8.

In the reading unit 3, a conveying unit 10 that conveys an original along a prescribed conveying path, indicated by the bold broken line in FIG. 2B, is provided in the ADF 5, as illustrated in FIGS. 2A and 2B. The conveying unit 10 includes a supply roller 11, a separating roller 12A, a separating piece 12B, a relay roller 13, a conveying roller 14A, an upper pinch roller 14B, a lower pinch roller 14C, a discharging roller 15A, a discharging pinch roller 15B, and the like. These rollers, guide surfaces disposed among the rollers, and the like define the conveying path.

A first cover 16, a second cover 17, and a third cover 18 are provided on the upper surface of the ADF 5, as illustrated in FIGS. 1, 2A, and 2B. The first cover 16 is swingable around a swing axis 16A provided near the left end of the first cover 16, from a position indicated in FIG. 2A in a direction in which the right end of the first cover 16 is lifted. The second cover 17 is swingable around a swing axis 17A provided near the right end of the second cover 17 between a storage position indicated in FIG. 2A and a usage position indicated in FIG. 2B. The third cover 18 is swingable around a swing axis 18A provided near the right end of the third cover 18 between a horizontal position indicated in FIG. 2A and an incline position indicated in FIG. 2B.

When the second cover 17 and third cover 18 are positioned as illustrated in FIG. 2A, an arm 17B extending from the second cover 17 is caught by an arm retainer 18B of the third cover 18. That is, since the arm 17B extending from the second cover 17 supports the third cover 18 from its lower surface, the second cover 17 and third cover 18 form a horizontal surface. The horizontal surface formed by the second cover 17 and third cover 18 is not limited to a complete flat surface; the horizontal surface may include a slightly uneven portion and an inclined portion. When, in this state, the second cover 17 is swung from the storage position to the usage position, the arm 17B is displaced downwardly and pulls down a portion, of the third cover 18, near its left end. Thus, the third cover 18 swings from the horizontal position indicated in FIG. 2A to an incline position indicated in FIG. 2B in response to the swing of the second cover 17.

When the second cover 17 swings from the storage position to the usage position, the third cover 18 reaches the inclined position before the second cover 17 reaches the usage position. After that, however, the arm 17B comes off from the arm retainer 18B and the second cover 17 reaches the usage position without displacing the third cover 18. When the second cover 17 swings from the usage position to the storage position, the second cover 17 does not displace the third cover 18 at first, but the arm 17B enters the arm retainer 18B before the second cover 17 reaches the storage position. Accordingly, the arm 17B then lifts upwardly a portion, of the third cover 18, near its left end until the second cover 17 reaches the storage position. The third cover 18 thereby swings together with the second cover 17 and the third cover 18 reaches the horizontal position almost at the same time as when the second cover 17 reaches the storage state.

In the example embodiments shown, the ADF 5 includes a first support portion 21 that supports an original to be conveyed to the conveying unit 10 from the lower side of the original when the second cover 17 moves to the usage position and also includes a second support portion 22 that supports an original that has been discharged from the conveying unit 10 from the lower side of the original when the second cover 17 moves to the usage position. At least part of the first support portion 21 and at least part of the second support portion 22 are positioned so as to overlap each other vertically with a space therebetween. The first support portion 21 is disposed above the second support portion 22 and the second support portion 22 is disposed below the first support portion 21.

Figure 3:
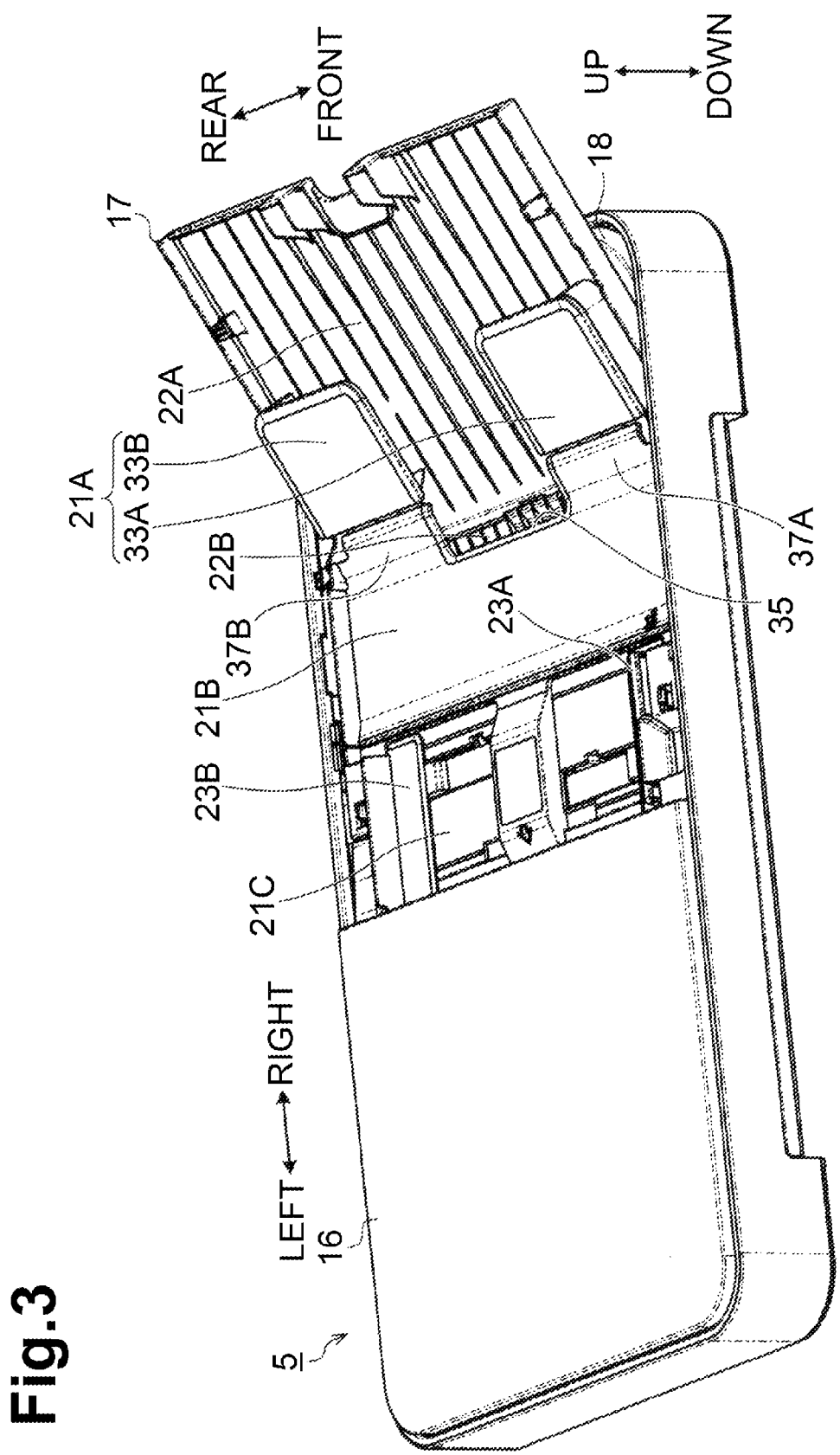
FIG. 3 is a perspective view illustrating a state in which the second cover is open.

As illustrated in FIGS. 2A, 2B, and 3, the first support portion 21 has a first upper support 21A that supports an original at a position farthest from the conveying unit 10, a second upper support 21B that supports the original at a position closer to the conveying unit 10 than the first upper support 21A is, and a third upper support 21C that supports the original at a position closer to the conveying unit 10 than the second upper support 21B is. The second support portion 22 has a first lower support 22A that supports an original at a position farthest from the conveying unit 10 and a second lower support 22B that supports the original at a position closer to the conveying unit 10 than the first lower support 22A is.

In the example embodiment shown, guides 23A and 23B are provided on the third upper support 21C. When the guides 23A and 23B abut the end of the original, supported by the first support portion 21, in the width direction, they restrict the conveying direction in which the origin is supplied from the first support portion 21 to the conveying unit 10 to a prescribed direction.

In an operational example, originals placed on the first support portion 21 are conveyed along the conveying path indicated by the bold broken line in FIG. 2B and are then discharged to the second support portion 22. Specifically, the originals fed by the supply roller 11 from the first support portion 21 to the downstream side in the conveying direction are separated by the separating roller 12A and separating piece 12B one sheet at a time. The separated original is further conveyed to the downstream side in the conveying direction by the relay roller 13 and conveying roller 14A and is then discharged by the discharging roller 15A onto the second support portion 22.

In the example embodiment shown, a first transparent portion 25A and a first original pressing part 27A are provided at positions along the conveying path between the conveying roller 14A and the discharging roller 15A. A second transparent portion 25B and a second original pressing part 27B are also provided at positions along the conveying path between the relay roller 13 and the conveying roller 14A.

The first transparent portion 25A is disposed in the FB 4, and the second transparent portion 25B, first original pressing part 27A and second original pressing part 27B are disposed in the ADF 5. In this embodiment, the first transparent portion 25A and second transparent portion 25B are made of a glass plate; they extend over a range beyond the width of the original in the width direction (fore and aft direction in this embodiment) orthogonal to the conveying direction of the original.

In the example embodiment shown, the first original pressing part 27A and second original pressing part 27B are made of a metal or hard resin material; they extend over a range beyond the width of the original as in the case of the first transparent portion 25A and second transparent portion 25B.

The first original pressing part 27A is urged toward the first transparent portion 25A by a spring (not illustrated). When the original passes the upper surface of the first transparent portion 25A while in contact with the upper surface, the first original pressing part 27A suppresses the original from being lifted from the first transparent portion 25A. The second original pressing part 27B is urged toward the second transparent portion 25B by a spring (not illustrated). When the original passes the upper surface of the second transparent portion 25B while in contact with the upper surface, the second original pressing part 27B suppresses the original from being lifted from the second transparent portion 25B.

A third transparent portion 25C is provided in the FB 4, and a third original pressing part 27C is provided in ADF 5. In this embodiment, the third transparent portion 25C is made of a glass plate as in the case of the first transparent portion 25A and second transparent portion 25B. However, the third transparent portion 25C differs from the first transparent portion 25A and second transparent portion 25B in that the third transparent portion 25C has a large area enough for the entire original from which to read an image to fit.

The third original pressing part 27C is made of a laminated body formed by laminating a foamed plastic layer and a hard resin film layer. When the ADF 5 is closed, the third original pressing part 27C comes into tight contact with the same side as the third transparent portion 25C while being elastically deformed, suppressing the original placed on the third transparent portion 25C from being lifted from the third transparent portion 25C.

The FB 4 includes a guide rail 29, a carriage 30, a first image sensor 31A, and the like. The ADF 5 includes a second image sensor 31B. The guide rail 29 is formed integrally with the inner surface at the bottom of a housing 4A of the FB 4. As depicted in the example shown, the guide rail 29 extends in the conveying direction (e.g. the right and left direction as shown) taken in this embodiment in a range from below the first transparent portion 25A to below the third transparent portion 25C in parallel to the lower surfaces of the first transparent portion 25A and third transparent portion 25C.

As depicted in the example shown, the carriage 30 is placed on the guide rail 29 and is supported so as to be bidirectionally movable in the conveying direction (e.g., in the right and left direction as shown) along the guide rail 29. The carriage 30 is linked to a timing belt (not illustrated). As the timing belt is circularly driven, the carriage 30 bidirectionally moves in the right and left direction by following the timing belt.

In this embodiment, contact image sensors (CISs) are used as the first image sensor 31A and second image sensor 31B. The first image sensor 31A is mounted on the carriage 30 and is bidirectionally moved in the conveying direction (e.g., in the right and left direction as shown) together with the carriage 30.

A spring (not illustrated) is interposed between the first image sensor 31A and the carriage 30 so that the first image sensor 31A is urged upwardly. Spacers (not illustrated) are attached near both ends of the first image sensor 31A in the scanning direction, e.g., the front and rear direction as shown. The spacer that is urged upwardly together with the first image sensor 31A is in contact with the lower surface of the third transparent portion 25C or first transparent portion 25A.

Thus, when the first image sensor 31A bidirectionally moves together with the carriage 30, the spacer remains in contact with the lower surface of the third transparent portion 25C or first transparent portion 25A and the first image sensor 31A moves while keeping a fixed distance from the third transparent portion 25C or first transparent portion 25A.

The second image sensor 31B is disposed at a prescribed position and does not move from that position. The second image sensor 31B is also urged by a spring (not illustrated) toward the second transparent portion 25B, so the second image sensor 31B is also kept at a fixed distance from the second transparent portion 25B.

A plurality of reading elements provided in the first image sensor 31A and second image sensor 31B are arrayed in the scanning direction, e.g., the front and rear direction as shown in this embodiment. When an image on an original placed on the upper surface of the third transparent portion 25C is read, the first image sensor 31A moves together with the carriage 30 and reads the image.

When an image on an original conveyed by the conveying unit 10 is read, the first image sensor 31A remains stationary below the first original pressing part 27A and first transparent portion 25A and reads the image on the original that passes the upper surface of the first transparent portion 25A while in contact with the upper surface. Below the second original pressing part 27B and the second transparent portion 25B, the second image sensor 31B reads the image on the original that passes the upper surface of the second transparent portion 25B while in contact with the upper surface.

Details of the First Support Portion and Second Support Portion

In the example embodiments shown, the first upper support 21A is secured to the second cover 17 as illustrated in FIGS. 2A, 2B and 3. When the first lower support 22A is displaced, therefore, the first upper support 21A swings together with the second cover 17 and moves together with the first lower support 22A between the usage position and the storage position without changing a position relative to the first lower support 22A.

The first upper support 21A has a pair of support areas 33A and 33B spaced apart from each other in the width direction of the original, which is orthogonal to its conveying direction. With the second cover 17 at the usage position, the first upper support 21A supports the original with the paired support areas 33A and 33B. With the second cover 17 at the storage position, the first upper support 21A is stored below the second cover 17, reducing an amount by which the first upper support 21A protrudes outwardly beyond the device when compared with the state in which the second cover 17 is at the usage position. With the second cover 17 at the usage position, the paired support areas 33A and 33B are downwardly inclined toward the second upper support 21B.

Figure 4A:
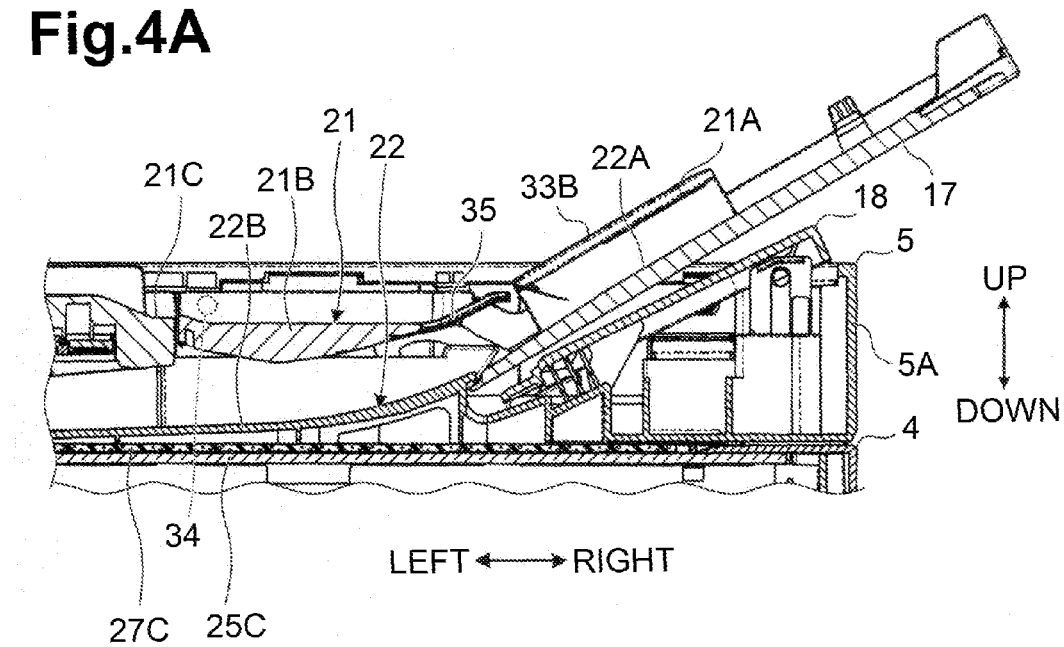
FIG. 4A is a partial cross sectional view illustrating a state in which a second upper support of the ADF is closed.
Figure 4B:
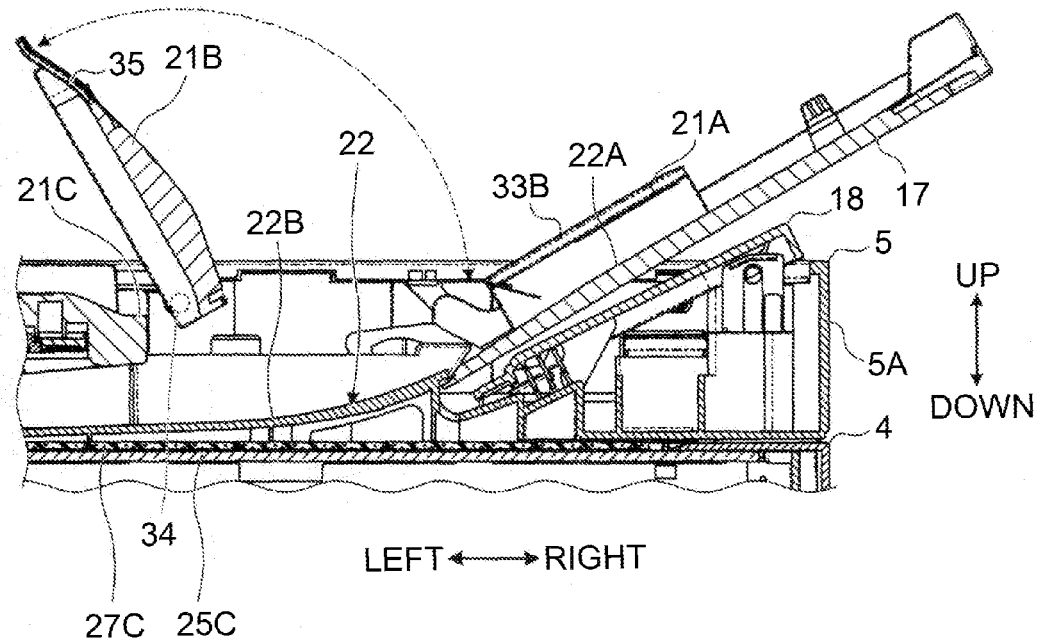
FIG. 4B is a partial cross sectional view illustrating a state in which the second upper support is open.
Figure 5:
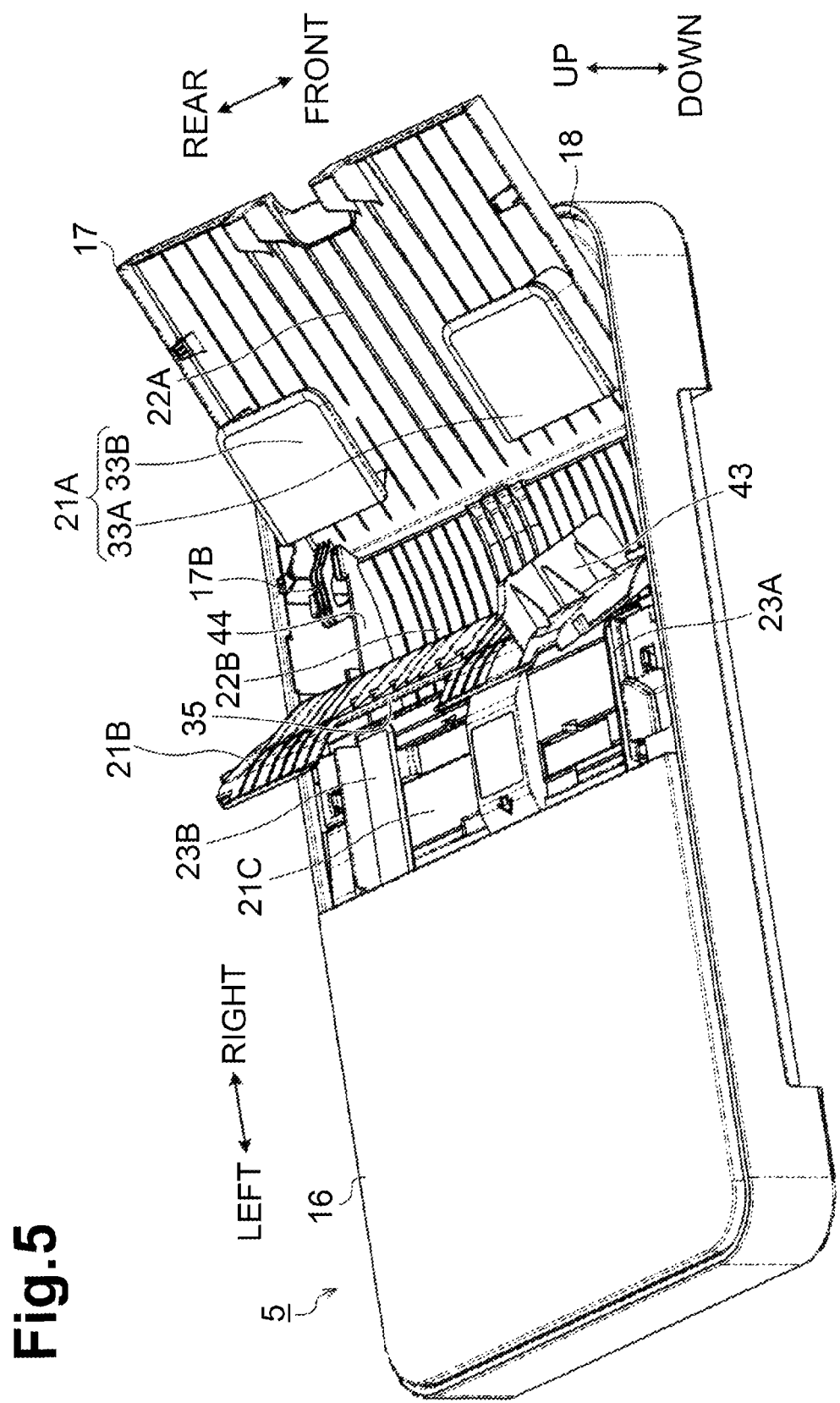
FIG. 5 is a perspective view illustrating a state in which the second upper support is open.

The second upper support 21B is attached to a housing 5A of the ADF 5 so as to be swingable around a swing axis 34, as illustrated in FIGS. 4A, 4B, and 5. The second upper support 21B is movable between the closed position illustrated in FIG. 4A and the open position illustrated in FIG. 4B. The second upper support 21B at the closed position supports the original. When the second upper support 21B moves to the closed position, part of the second lower support 22B below the second upper support 21B is exposed.

The second upper support 21B has a notch 35 at an end close to the first upper support 21A. Immediately below the notch 35, part of the second support portion 22 is exposed. A portion at which the notch 35 is formed is also used as a handy-grip recess by the user to hold the second upper support 21B with a hand and open and close the second upper support 21B. The second upper support 21B has portions 37A and 37B at both sides of the notch 35 in the width direction. With the second upper support 21B at the closed position, the portions 37A and 37B are downwardly inclined from a side close to the first upper support 21A toward the third upper support 21C. The third upper support 21C is secured to the housing 5A of the ADF 5.

The first lower support 22A is one side of the second cover 17. With the second cover 17 at the storage position, the first lower support 22A is disposed at a position at which it covers the first support portion 21. A portion equivalent to the back of the first lower support 22A forms part of the exterior of the device at its top. The second lower support 22B is the bottom of the housing 5A of the ADF 5.

Figure 6:
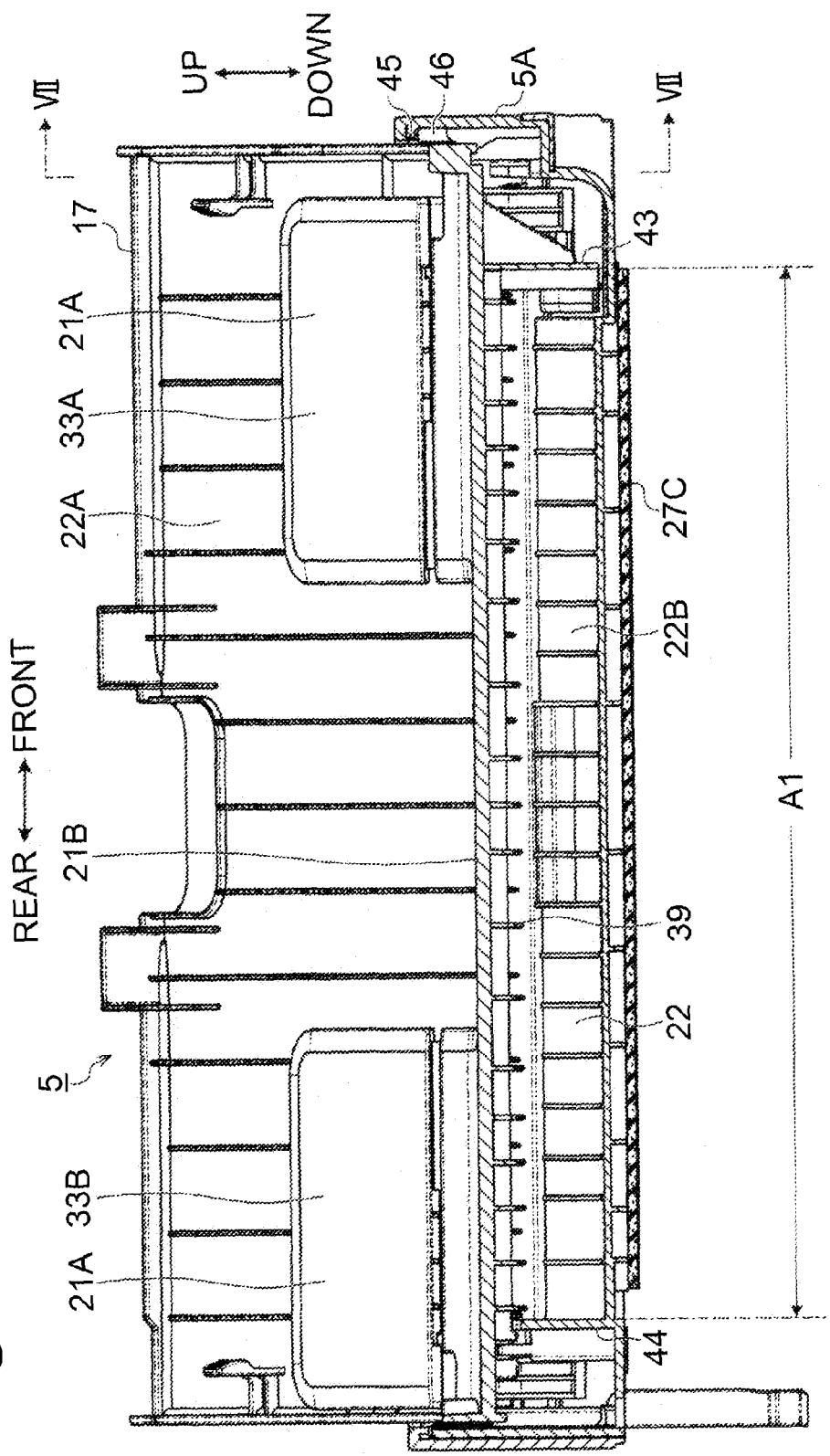
FIG. 6 is a cross sectional view taken along line VI-VI in FIG. 2B.

The second upper support 21B has a plurality of ribs 39 extending toward the second support portion 22 at positions at which the ribs 39 face the second support portion 22 with the second upper support 21B at the closed position, as illustrated in FIG. 6. When the original is discharged onto the second support portion 22, if the original is displaced upwardly, it comes into contact with the lower edges of these ribs 39, so upward displacement of the original is restricted and the original is guided toward the downstream in the conveying direction.

The second upper support 21B also has an extending wall 43 extending toward the second support portion 22 at a portion at which the extending wall 43 faces the second support portion 22 with the second upper support 21B at the closed position. The extending wall 43 restricts displacement of the original at the second support portion 22 in a direction (specifically, a direction toward the front in the drawings) orthogonal to the conveying direction of the original.

A partition wall 44 is formed on the second lower support 22B. The partition wall 44 also restricts the original placed in the second support portion 22 from being displaced in a direction (specifically, a direction toward the back in the drawings) orthogonal to the conveying direction of the original. Accordingly, the original is discharged to the range of an area A1 between the extending wall 43 and the partition wall 44 along the conveying direction. When the second upper support 21B is moved to the open position, however, the extending wall 43 is lifted together with the second upper support 21B, releasing the restriction by the extending wall 43. Therefore, the original that has been discharged to the range of the area A1 can be easily taken out when compared with a case in which an equivalent to the extending wall 43 is secured on the same side as the second lower support 22B.

A stopper 45 is attached to the housing 5A of the ADF 5. When the second upper support 21B reaches the open position during its movement from the closed position to the open position, the stopper 45 abuts a stopper abutting portion 46 of the second upper support 21B as illustrated in FIG. 7, preventing the second upper support 21B from moving beyond the open position.

Advantageous Effects

With the multi-function peripheral 1 described so far, reading unit 3 as described above has effects as described below. In the reading unit 3, the second upper support 21B is movable between the closed position and the open position. The second upper support 21B at the open position exposes part of the second support portion 22. Therefore, even if an original has a small dimension (e.g., shorter than the length between a discharging roller 15A and an edge of the second upper support 21B adjacent the first upper support 21A) in the conveying direction is discharged to the second support portion 22 and a space below the first upper support 21A is too narrow to insert a hand with ease, the user can easily take out the small original by moving the second upper support 21B to the open position. Another advantage is that even if an original is jammed at a position immediately below the second lower support 22B and a space below the first upper support 21A is too narrow to insert a hand with ease, the user can easily access the original and can eliminate the jam by moving the second upper support 21B to the open position. Therefore, the second upper support 21B of this type eliminates the need to enlarge the dimension, in the height direction, of a space formed between the second support portion 22 and the first upper support 21A at the usage position so that the dimension is enough for the user to insert a hand. Thus, the dimension of the device in the height direction can be reduced in the vicinity of the first support portion 21, enabling the device to be thinned.

In the above reading unit 3, the paired support areas 33A and 33B, constituting the first upper support 21A, are spaced apart from each other. Therefore, part of the second support portion 22 is exposed to the outside between the paired support areas 33A and 33B, so even if a space below the first upper support 21A is a little narrow, the user can access the original through the space between the paired support areas 33A and 33B. Therefore, the user can easily take out the original placed at a position at the back of the second support portion 22 and can easily eliminate a jam generated at a position at the back of the second support portion 22, when compared with a case in which the paired support areas 33A and 33B as described above are not provided.

In the above reading unit 3, the second upper support 21B has the notch 35 as described above. Therefore, the user can access the original through the notch 35 without having to move the second upper support 21B to the open position, depending on the size of the original. In this case, extra work that would otherwise be required to move the second upper support 21B to the open position is eliminated, so the user can more easily take out the original placed at a position at the back of the second support portion 22 and can more easily eliminate a jam generated at a position at the back of the second support portion 22.

In the above reading unit 3, a range in which the original supported by the second support portion 22 can be displaced is restricted by the lower edges of the ribs 39. Therefore, excessive frictional resistance is less likely to be exerted on the original and the conveying of the original is less likely to be impeded, when compared with a case in which the original touches a contact surface having a larger area than the lower edges of the ribs 39.

According to the above reading unit 3, the user can use the notch 35 as a handy-grip recess. The user can hold the second upper support 21B through the handy-grip recess with a hand and can swing the second upper support 21B. Therefore, the user can easily open and close the second upper support 21B when compared with a case in which a portion through which the user holds the second upper support 21B with a hand is not provided.

In the above reading unit 3, when the second upper support 21B is moved to the open position, the stopper 45 abuts the second upper support 21B, preventing the second upper support 21B from moving beyond the open position. Unlike a case in which the stopper 45 of this type is not provided, therefore, after the second upper support 21B has been appropriately moved to the open position, it becomes possible to place and take out a small original at a position at the back of the second support portion 22 and to eliminate a jam generated at a position at the back of the second support portion 22.

According to the above reading unit 3, a range in which the original supported by the second support portion 22 can be displaced is restricted by a side surface of the extending wall 43. Unlike a case in which the extending wall 43 of this type is not provided, therefore, it is possible to suppress the original from being largely displaced toward a side (in the fore and aft direction in the above embodiment) and thereby it is possible to prevent or suppress a jam from occurring due to a skew of the original or its deviation toward the side.

In the above reading unit 3, when the first upper support 21A is moved to the storage position, an amount by which the first upper support 21A protrudes outwardly beyond the device is reduced, so a space occupied by the device not in use can be reduced.

In the above reading unit 3, the first upper support 21A moves together with the first lower support 22A between the usage position and the storage position. Therefore, the user can move the first lower support 22A and first upper support 21A together without having to perform a burdensome manipulation to move the first lower support 22A and first upper support 21A individually.

According to the above reading unit 3, when the first lower support 22A is moved to the storage position, the first lower support 22A is placed in a state in which it forms part of the exterior of the device at its top, so the first support portion 21 is covered by the first lower support 22A. When the first lower support 22A is moved to the storage position, therefore, it is possible to prevent or suppress an unpredictable foreign matter from hitting the first support portion 21 and dust from building up on the first support portion 21.

According to the above reading unit 3, the guides 23A and 23B provided on the third upper support 21C can suppress the original from being largely displaced toward a side (in the fore and aft direction in the above embodiment), so it is possible to prevent or suppress a jam from occurring due to the skew of the original or its deviation toward the side.

OTHER EMBODIMENTS

So far, the image reading device has been described in a specific embodiment in which the image reading device is structured as the multi-function peripheral 1, but the present invention is not limited to the above embodiment. Various embodiments can be practiced without departing from the technical concept of the present invention.

For example, in the above embodiment, the first support portion 21 has been disposed above the second support portion 22, and the conveying unit 10 has conveyed an original from the first support portion 21 on the upper side to the second support portion 22 on the lower side. However, the direction in which the conveying unit 10 conveys the original may be reversed. That is, the first support portion 21 may be disposed below the second support portion 22, and the conveying unit 10 may convey the original from the first support portion 21 on the lower side to the second support portion 22 on the upper side.

In this structure, even if a space below the second support portion 22 is too narrow to insert a hand with ease when an original with a small dimension in the conveying direction is to be placed near the conveying unit 10, the user can easily place the small original near the conveying unit 10 by moving a portion equivalent to the second upper support 21B to the open position. Even if an original to be fed to the conveying unit 10 is jammed, the user can easily eliminate the jam by moving the portion equivalent to the second upper support 21B to the open position.

In the above embodiment, the reading unit 3 has had the first image sensor 31A and second image sensor 31B, but a structure equivalent to the second image sensor 31B may or may not be provided.

Although, in the above embodiment, an example in which the reading unit 3 is incorporated into the multi-function peripheral 1 has been described, the above structure may be used in an image reading device structured as a single-function image scanner.

What is claimed is:

1. An image reading device comprising:
a conveying unit defining a conveying path;
an upper support portion positioned to support a sheet at a first end of the conveying path;
a lower support portion positioned to support a sheet at a second end of the conveying path; and
a read unit positioned along the conveying path;
wherein the upper support portion is disposed above the lower support portion such that the upper support portion and the lower support portion are positioned so as to at least partially overlap and be spaced apart from each other vertically;
the upper support portion has a first upper support farthest from the conveying unit, a second upper support closer to the conveying unit than the first upper support, and a third upper support closer to the conveying unit than the second upper support, and
the second upper support is movable between a closed position and an open position, the second upper support positioned to support a sheet in the closed position and to expose at least a part of the lower support portion in the open position, the second upper support having an upper surface in the closed position that lacks a sheet guide.

2. The image reading device according to claim 1, wherein the upper support portion supports a sheet to be conveyed to the conveying unit, and the lower support portion supports a sheet that has been discharged from the conveying unit.

3. The image reading device according to claim 1, wherein the upper support portion supports a sheet that has been discharged from the conveying unit and the lower support portion supports a sheet to be conveyed to the conveying unit.

4. The image reading device according to claim 1, wherein the first upper support has a pair of support areas spaced apart from each other in a direction orthogonal to a conveying direction, the first upper support being configured to support a sheet with the pair of support areas.

5. The image reading device according to claim 4, further comprising an aperture in the second upper support, the aperture exposing at least a part of the lower support portion.

6. The image reading device according to claim 5, wherein the aperture comprises a notch positioned along an edge of the second upper support closest to the first upper support.

7. The image reading device according to claim 6, wherein the notch is aligned with a gap between the pair of support areas.

8. The image reading device according to claim 6, wherein the second upper support has portions at both sides of the notch in the direction orthogonal to the conveying direction, the portions being downwardly inclined from a side closest to the first upper support toward the third upper support.

9. The image reading device according to claim 4, wherein the pair of support areas of the first upper support is downwardly inclined toward the second upper support.

10. The image reading device according to claim 1, wherein the second upper support has a surface having a plurality of ribs disposed thereon, each of the plurality of ribs extending toward the lower support portion when the surface of the second upper support faces the lower support portion, the plurality of ribs oriented in the conveying direction.

11. The image reading device according to claim 10, wherein at least one of the plurality of ribs is positioned to restrict lateral displacement of a sheet positioned on the lower support portion when the second upper support is in the closed position.

12. The image reading device according to claim 1, wherein the second upper support is pivotable between the closed position and the open position around an axial line orthogonal to the conveying direction, the second upper support including a grip recess formed at an end of the second upper support closest to the first upper support.

13. The image reading device according to claim 1, further comprising a stopper positioned to contact the second upper support when the second upper support is in the open position, the stopper preventing movement of the second upper support past the open position.

14. The image reading device according to claim 1, wherein the second upper support has an extending wall extending toward the lower support portion when the second upper support portion is in the closed position.

15. The image reading device according to claim 14, wherein the extending wall contacts the lower support portion and is configured to restrict displacement of a sheet at the lower support portion in a direction orthogonal to the conveying direction.

16. The image reading device according to claim 1, wherein the second upper support is positioned below an upper edge of a housing of the device, and wherein the first upper support is movable between open and closed positions, the first upper support positioned below the upper edge of the housing and above the second upper support when the first upper support portion is in the closed position.

17. The image reading device according to claim 16, wherein the lower support portion has a first lower support movable together with the first upper support without a change to relative positions of the first lower support and first upper support, the first lower support at a position farthest from the conveying unit when the first upper support is in the open position, and wherein, when the first upper support is in the closed position, the first lower support forms at least a portion of an exterior of the image reading device.

18. The image reading device according to claim 1, wherein the third upper support includes a sheet guide.

19. The image reading device according to claim 1, wherein the conveying unit comprises a discharging roller positioned along the conveying path and adjacent to either the upper support portion or the lower support portion.

20. The image reading device according to claim 1, wherein the conveying unit includes a separating roller, the separating roller positioned along a portion of the conveying path nearest to either the upper support portion or the lower support portion.

21. The image reading device according to claim 20, wherein the portion of the conveying path further includes a supply roller positioned between the separating roller and the nearest of the upper support portion and the lower support portion along the conveying path.

* * * * *